(12) United States Patent
Buros et al.

(10) Patent No.: US 12,502,840 B2
(45) Date of Patent: Dec. 23, 2025

(54) METHOD FOR EMBEDDING AN RFID TAG INTO A MAT

(71) Applicant: DATAMARS SA, Lamone (CH)

(72) Inventors: Julien Buros, Cassina d'Agno (CH); Luca Cerea, Varese (IT)

(73) Assignee: DATAMARS SA, Lamone (CH)

( * ) Notice: Subject to any disclaimer, the term of this patent is extended or adjusted under 35 U.S.C. 154(b) by 97 days.

(21) Appl. No.: 18/612,530

(22) Filed: Mar. 21, 2024

(65) Prior Publication Data

US 2024/0316872 A1 Sep. 26, 2024

(30) Foreign Application Priority Data

Mar. 22, 2023 (EP) .................................... 23163515

(51) Int. Cl.
*B29C 65/02* (2006.01)
*A47G 27/02* (2006.01)
*B29L 31/00* (2006.01)

(52) U.S. Cl.
CPC .......... *B29C 65/02* (2013.01); *A47G 27/0243* (2013.01); *B29L 2031/7324* (2013.01)

(58) Field of Classification Search
CPC .... B29C 65/02; G06K 19/07758; H04B 5/77; A47G 27/0243; A47L 23/266; B29L 2031/7324
USPC ...................................................... 156/303.1
See application file for complete search history.

(56) References Cited

U.S. PATENT DOCUMENTS

| | | | |
|---|---|---|---|
| 10,546,227 B2 * | 1/2020 | Marciello | ................. E04D 5/06 |
| 2007/0296597 A1 | 12/2007 | Nizzola | |
| 2019/0039341 A1 | 2/2019 | Keenan et al. | |

FOREIGN PATENT DOCUMENTS

| | | |
|---|---|---|
| CN | 106419442 B | 1/2019 |
| JP | 202143534 A | 3/2021 |
| WO | 2017136752 A1 | 8/2017 |

* cited by examiner

*Primary Examiner* — James D Sells
(74) *Attorney, Agent, or Firm* — The Webb Law Firm

(57) ABSTRACT

Disclosed is a method for embedding an electronic device, for instance an RFID tag, into a mat, the mat having a bottom support intended to contact a floor, in use, and including a first material, a walkable layer arranged on top of the bottom support, including a second material. The electronic device is supported by a solid carrier. The bottom support and the walkable layer of the mat are fully assembled, so as the mat is already available for use to walk on, before embedding the electronic device; a material of the solid carrier and the first material of the bottom support of the mat are suitable to join if contacted each other and subject to a temperature and/or a pressure above predetermined thresholds, the pressure pushing the electronic device against the bottom support. Embedding the electronic device to the mat includes placing the solid carrier on a flat portion of the bottom support of the mat; applying the pressure and/or temperature to the solid carrier; ending application of pressure and/or temperature. The step of applying pressure and/or temperature is ended after the solid carrier is melted in the solid carrier and/or dissolved, and the electronic device remains embedded in the bottom support. Embedding is not reversible and the solid carrier is no longer detachable from the bottom substrate.

19 Claims, 1 Drawing Sheet

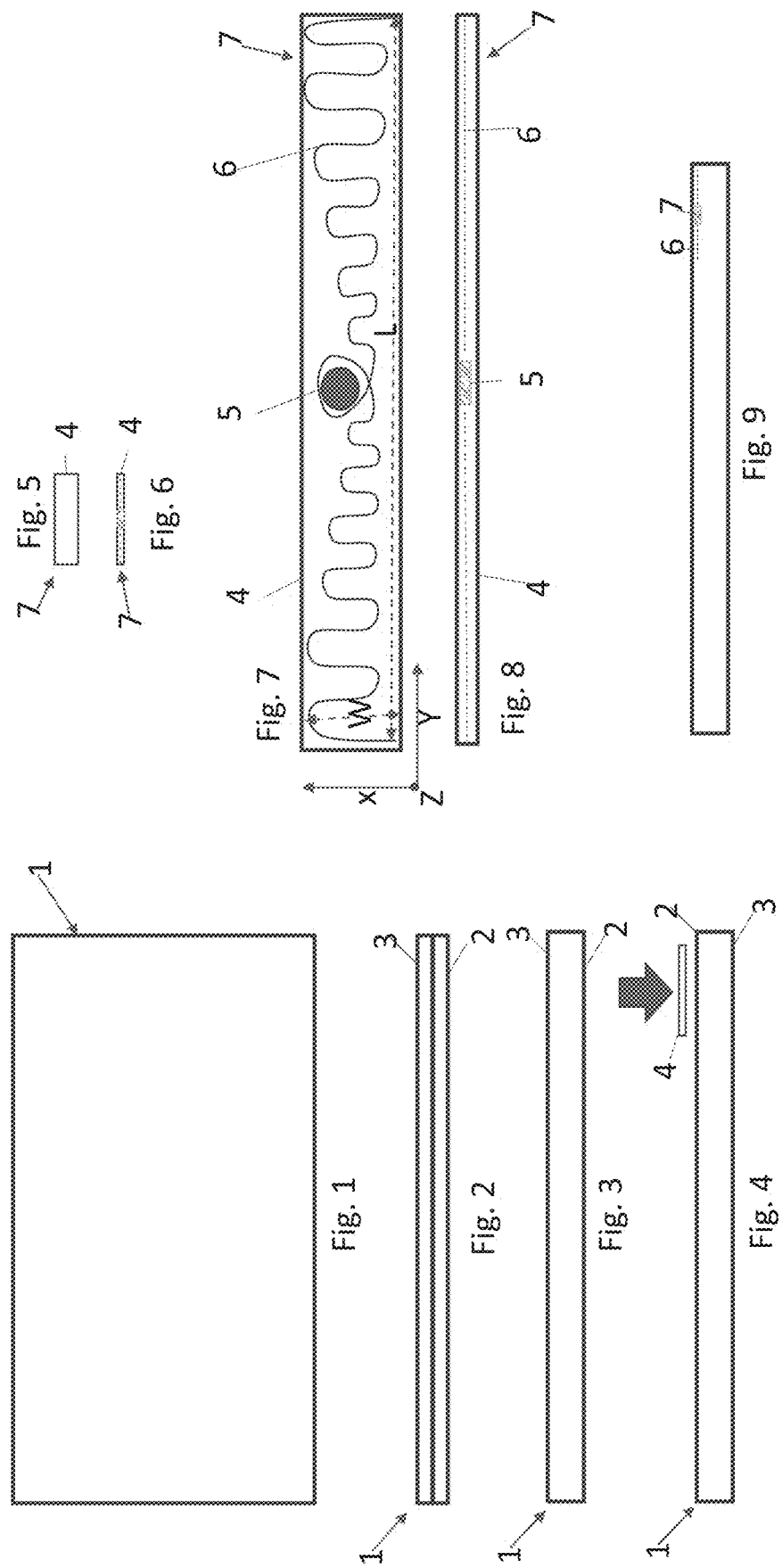

METHOD FOR EMBEDDING AN RFID TAG INTO A MAT

CROSS REFERENCE TO RELATED APPLICATION

This application claims priority to European Patent Application No. 23163515.2, filed Mar. 22, 2023, the disclosure of which is hereby incorporated by reference in its entirety.

BACKGROUND OF THE INVENTION

Field of the Invention

The present invention discloses a method for embedding an electronic device into a mat. In particular, the mat includes a bottom support intended to contact a floor, in use, and a walkable layer, arranged on top of the bottom support, and the electronic device is embedded in the bottom support.

The electronic device may be used for mat identification, for instance to track and trace movement of the mat from a client's site (home, shop, etc. . . . ) to an industrial laundry, within the industrial laundry itself and then back to the client's site. The electronic device may be used also for other functions.

Description of Related Art

Physical tracking and tracing of inventory, raw materials, materials in manufacture, or other items and assets in a variety of locations, such as manufacturing facilities, libraries, offices or the like can be accomplished by using an RFID system. The basic RFID system includes an RFID reader or interrogator and an electronic device pre-programmed with unique identifying information. The electronic device is for instance a transponder (also known as tag or RFID tag).

Physical tracking and tracing of mat is a known application of RFID system, wherein the RFID tag (the electronic device) is embedded in the mat for identification thereof, in particular for tracking and tracing the mat when it is delivered to or from a laundry. However, the electronic device may be adopted for other purposes, to cite one, to count people passing thorough an entrance (where the mat is placed).

In known processes of manufacturing the mat, the RFID tag is embedded during layering deposition of the mat or during a step of moulding the mat base layer, which is a bottom support intended to stay in contact with a floor, during use. For instance, the RFID tag is sandwiched between two or more layers and is finally hidden into the mat material.

Although this method allows the RFID tag to be attached to the mat, it suffers of some limitations due to the fact that it is not applicable to an already manufactured mat, for instance a mat already on the market or already in use, such as in a shop.

Moreover, the above method suffers for the unreliability of the attachment. It is indeed known that low adhesion between the RFID tag and the mat is obtained when the RFID tag naked is placed between different layers during manufacturing.

To work around this issue, some mat suppliers provide the RFID tag in a rubber pouch and place the pouch (with the RFID tag inside) in between the different layers of the mat, during manufacturing.

The pouch is a sort of bag, in which the RFID tag is inserted. The rubber pouch has an increased adhesion to the mat with respect to a naked RFID tag. However, it complicates mat manufacturing and increase costs.

This is not a secondary problem.

Moreover, lot of mats are still not equipped with an RFID tag and the laundry has to find a way for tracking and tracing them by adopting system applicable after mat manufacturing, at the same time cost effective.

In this attempt, some mat suppliers tried to laminate another layer on the back of an already manufactured mat to sandwich the RFID tag between said another layer and the back, in other words retrofitting the RFID tag on the already manufactured mat.

A common way to do it is to use a rubber pouch similar to the one described before.

However, also this process is expensive.

Moreover, the process potentially creates a discontinuity or a step on back of the mat, and this is not desirable since it reduces adhesion to the floor, leaving room for dust and dirt. Moreover, due to pouch, the back of the mat is not fairly planar in the area of the pouch. Further, the step formed by attaching the pouch can be felt when walking on the mat. Last, but not least, the area where the pouch is attached may be subject to excessive wearing/abrasion.

In an attempt to avoid discontinuity, another method provides to excavate the bottom support of the mat in a predetermined area and then to close the previously excavated area with a patch to which the RFID tag is glued. The patch is in turn glued to the excavated area.

Although the patch may lay on a same plane with the bottom support, in any case a discontinuity is formed in the mat structure; moreover, the RFID tag is not definitely embedded to the mat material but is just glued to the patch and, with it, to the bottom support, with risks to be detached.

The problem at the base of the present invention is that of embedding a RFID tag (i.e. an electronic device) into the mat, without damaging the mat structure but at the same time providing an easy way to couple the RFID tag to the mat, also after manufacturing thereof, solving the limitation that currently affects the prior art methods. The scope of the invention is in particular avoiding costs increase, especially those associated to rubber pouch needed to insure a good bonding between the RFID tag and the mat.

SUMMARY OF THE INVENTION

In the following, the term "mat" is used. However, the method is applicable also to carpets, rugs or similar products. Mats are typically smaller than carpets and rugs. Mats are manufactured for a specific purpose, usually to clean the soles of shoes of pedestrian traffic and to increase traction on the floor. Entrance mats are designed to trap dirt, debris, and water or snow and ice. Rugs are relatively small, usually larger than mats. The word "rug" usually refers to a discrete piece of carpet, typically used as a decorative accent. Rugs are not generally designed or manufactured to trap water or dirt, although they can increase traction. Rugs do not require any special installation and can be changed out easily. Carpets usually refers to wall-to-wall carpeting that is installed by professionals. Carpets come in rolls or in tiles, and commercial-grade carpeting is manufactured to withstand heavy traffic and to be stain resistant. Mats can be placed on top of carpeting, and rugs can be placed on top of carpeting for a decorative accent. In view of the above, when the term "mat" is used in the following description, such term has to be read as encompassing a rug or a carpet.

The idea of the present invention is that of providing an improved method to embed an electronic device, for instance a tag (i.e. an RFID tag), into a mat which is already finished or during its manufacturing.

In the following description reference is made to a RFID tag as an electronic device. The RFID tag includes an RFID chip and an antenna. However, the description is not limited to the specific components of the RFID tag.

Therefore, when the term "tag" is used in the following description, it has not to be read in limiting terms as to the arrangement of its electronic components. To the contrary, the RFID tag has to be considered an electronic device, having one dimension (the thickness) which is significantly smaller than the other dimensions (width, length), such as a label. Moreover, the function of the RFID tag is not limiting for the present invention, meaning that the RFID tag may be for identification purpose but also for other or additional purposes.

"Finished" (mat) means ready for use, i.e. the mat be put on place, in particular on a floor, and ready for walking thereon, although not still coupled with an RFID tag. The method is therefore suitable to apply an RFID tag to all those new mats just manufactured or to old mats manufactured in the past, already used and needing to be provided with an RFID tag (for identification or other purpose). Finished, in other words, means that the steps of the method to embed the RFID tag into the mat according to the present invention are not carried out during a step of manufacturing the mat, such as during a step moulding a bottom support thereof or during a step of attaching a walkable layer on the bottom support, but instead after all the manufacturing steps of the mat have been carried out, potentially after the mat has been put on the market or even used by a user.

As cited above, however, the method of the present invention may be carried out also during manufacturing of the mat such as during moulding the bottom support of the mat or while attaching a walkable layer on the bottom support.

The idea of solution of the present invention is that of coupling the RFID tag with the mat in such a way that the RFID tag is enveloped or embedded in the mat as a result of the application of heat and pressure on the RFID tag when the RFID tag is placed in contact with the bottom support of the mat.

In one embodiment, the process includes increasing a temperature and applying a pressure on a carrier of the RFID tag and on a portion of the bottom support of the mat where the RFID tag is placed. The carrier is a substrate that supports the electronic component of the RFID tag (such as the RFID chip and the antenna). The carrier is not a pouch or a bag. The RFID tag's antenna and the RFID tag's electronic components do not move on or within the carrier.

Before increasing the temperature and applying the pressure, the bottom support of the mat and the carrier are in solid state. During application of temperature, the status of the bottom support of the mat and the of the carrier partially changes until promotion of merge between their materials at the portion of the bottom support of the mat where the carrier is placed. After end of application of temperature and pressure, the status changes again into solid and the electronic components of the RFID tag are embedded into the bottom support. The process is not reversible, meaning that the carrier can no longer be identified or separated from the bottom support of the mat, neither if temperature is increased. The RFID tag (meaning here the electronic components of the RFID tag, since the carrier is no more distinguishable in the bottom support of the mat) remains trapped into the bottom support.

In one embodiment, the carrier may in part dissolve due to increase of temperature and only part of the material constituting the carrier in solid status joins with the material of the bottom support of the mat.

Based on the solution idea mentioned above, the technical problem at the base of the present invention is solved by a method according to claim 1. Advantageous embodiments of the method are claimed in the dependent claims.

Advantageously, according to the method of the invention, it is not required to provide a free space in the bottom support of the mat for housing the RFID tag. The RFID tag components (antenna, RFID chip, . . . ) enter into the material of the bottom support which has not voids and melts or fuse with the carrier of the tag.

Advantageously, the steps for manufacturing the mat into a finished mat are not altered, since the RFID tag is embedded at a later stage.

Advantageously, the RFID tag may be attached to the finished mat or during mat manufacturing, in any case reducing costs with respect to the known processes in which a pouch is used for casing the RFID tag.

Advantageously, the RFID tag is closed to an outer surface of the bottom support, in optimal position to be read, but at the same time it is protected by a thin layer of materials merged from the carrier and the bottom support.

BRIEF DESCRIPTION OF THE DRAWINGS

The terms Fig., Figs., Figure, and Figures are used interchangeably in the specification to refer to the corresponding figures in the drawings.

FIG. 1 is a top view of a mat, which is finished mat, i.e. a mat ready for use.

FIG. 2 is a side view of the mat of FIG. 1, wherein a bottom support and a walkable layer of the mats are indicated.

FIG. 3 is the side view of FIG. 2, without distinction indication of bottom support and a walkable layer.

FIG. 4 schematically represents a step of the method for embedding a RFID tag into the mat of FIG. 1, according to the present invention, wherein a carrier of the RFID tag and the carped are represented in a side view.

FIG. 5 is a top view of the carrier of the RFID tag of FIG. 4.

FIG. 6 is a cross sectional view of the carrier of the RFID tag of FIG. 4.

FIG. 7 is an enlarged top view of the carrier of the RFID tag of FIG. 4.

FIG. 8 is an enlarged cross-sectional view of the carrier of the RFID tag of FIG. 4.

FIG. 9 schematically represents the RFID tag and the carped in the side view, after completion of the method of the present invention.

DESCRIPTION OF THE INVENTION

With reference to the drawings, it is hereafter disclosed a method for embedding an RFID tag into a mat according to the present invention.

The mat 1 is schematically represented in a top view in FIG. 1 and, in a side view, in FIG. 2. As shown in FIG. 2, the mat 1 includes layers 2, 3. A bottom layer forms the bottom support 2 of the mat, which is intended to contact a floor, in use. The bottom support includes a first material. The first material is suitable to avoid slip of the mat 1 onto the floor. The first material is for instance vulcanized rubber. Thickness of the bottom layer may range from 3 mm to 2 cm, for example.

The top layer is a walkable layer 3 arranged on top of the bottom support 2 and includes a second material. The term layer, when referred to the walkable layer 3, has not to be limited to a continuous layer but rather encompass woven fibers "layers", to cite one. The walkable layer 3 is the visible layer of the mat and may be directly attached to the bottom support 3 with other layers interposed therebetween. In the schematic drawing of FIG. 2, the walkable layer 3 is directly on the bottom support 2, which is for instance in vulcanized rubber. Once coupled, the walkable layer 3 and the bottom support 2 may be not easily distinguished, like in FIG. 3.

Although the following description is made with reference to the bottom support and to the walkable layer, the mat may be composed of one layer only, for instance constituted by the bottom support itself. In this case, the bottom support has a side intended to contact the floor, in use, and another side which is walkable. Therefore, when in the following description reference is made to a walkable layer, the reader may understand that such layer is integrated into (is formed by) the bottom support, and that the walkable layer is therefore in the same material of the bottom support. Accordingly, also the schematic drawings of the FIGS. 1 to 9 are given only for exemplificative purpose and for explaining how the method is carried out, not limiting the layering structure of the mat.

The RFID tag 7 is represented in a top view in FIG. 5 and in a cross-sectional side view in FIG. 5. The RFID tag 7 is an electronic device; it may be adopted for identification purpose and/or to implement other functions in association with the mat. The RFID tag includes for instance an RFID chip 5 and an antenna 6 coupled or connected to the RFID chip 5. As stated above, the description is not limited to the specific components (RFID chip 5, antenna 6, etc) disclosed for the RFID tag or to their arrangement in the RFID tag.

According to the invention, however, the RFID tag includes a solid carrier 4 supporting the electronic components of the RFID tag (the RFID chip 5, the antenna 6, etc).

In one embodiment, the bottom support 2 and the walkable layer 3 of the mat 1 are fully assembled, so as the mat 1 is already available for use to walk on, before embedding the RFID tag 7. FIG. 4 schematically represents a first step of the method of the present invention wherein the RFID tag 7 is put in contact with the bottom support 2 of the mat, in this example the finished mat, for instance a mat already in use at the client's home and not still coupled to the RFID tag.

According to the present invention, a material of the solid carrier 4 of the RFID tag and the first material of the bottom support 2 of the mat 1 are suitable to join if contacted each other and subject to a temperature and/or a pressure above predetermined threshold.

The pressure serves to push the RFID tag 7 against the bottom support 2. At least, the pressure is the one exerted by the RFID tag 7 on the bottom support 2 due to the weight of the RFID tag 7. In such case, the RFID tag 7 is mainly embedded due to the application of temperature.

Embedding the RFID tag 7 into the mat 1 includes the steps of:
  placing the solid carrier 4 on a surface portion of the bottom support 2 of the mat 1 which is flat;
  applying the pressure and/or temperature to the solid carrier 4;
  ending application of the pressure and/or temperature.

The step of applying pressure and/or temperature is ended after the solid carrier 4 is melted in the bottom support 2 and/or dissolved.

Advantageously, the shape of the bottom support 2 is unchanged. After embedding the RFID tag with the carrier 4, the surface portion remains flat as before. No shape change is perceived.

Before the step of applying pressure and/or temperature, the bottom support 2 of the mat 1 and the carrier 4 of the RFID tag 7 are in solid state. During the step of applying pressure and/or temperature, the status of the carrier 4 and the bottom support 2 partially changes until promotion of merge (between materials) at the portion of the bottom support 2 of the mat 1 where the RFID tag 7 is placed. After end of said application of temperature, the status of the bottom support 2 and the carrier 4 changes again into solid and the RFID tag 7 is embedded into the bottom support 2.

The RFID chip 5 and the antenna 6 (or any other electronic components of the RFID tag) remains embedded in the bottom support 2.

Embedding is not reversible and the solid carrier 4 is no longer retrievable from the bottom substrate 2. In particular, whereas before applying pressure and/or temperature, the carrier 4 was part of the RFID tag for supporting the RFID tag's electronic components, after applying pressure and/or temperature, the carrier is melted or fused with the bottom support 2 of the mat so as to be indistinguishable from it, and the RFID tag's electronic components becomes part of the bottom support 2 of the mat.

As cited above, the shape of the bottom support 2 is unaltered by the method. The bottom support 2 (at least a portion thereof, whereon the carrier 4 is placed for embedding the RFID tag) is flat before and after application of the RFID tag. The bottom support 2 has no pockets for receiving the RFID tag's electronic components before the step of applying the temperature and/or the pressure and the bottom support 2 remains flat after an end of the step of applying the temperature and/or the pressure. No discontinuities are formed on the bottom support 2. The bottom support 2 of the mat does no undergo shape changes due to embedding the RFID tag 7. The RFID tag 7 is not structurally exposed to the outer surface of the bottom support 2 after being embedded, meaning that its electronic components do not directly touch the floor, in use, but they are protected by the bottom support, although they may be visible.

The carrier 4 is not a pouch or a bag. The carrier 4 embeds the RFID tag. No space is left between the RFID tag and the carrier 4.

In the embodiment mentioned above, the temperature of the RFID tag 7 immediately before the step of applying pressure and/or temperature is room temperature, preferably between 5 and 40° C.

In one embodiment, the solid carrier 4 is a bar or has a parallelepiped like shape. The bar is for instance represented in FIGS. 7 (top view) and 8 (cross size sectional view), enlarged. The bar has a width equal to or greater than a maximum width (W) of the antenna 6 in an X direction of the bar. A length of the bar is equal to or greater that a maximum length (L) of the antenna 6 in an Y direction and a thickness equal to or greater than a thickness of the RFID chip 5 in a Z direction. The antenna 6 surrounds at least in part the RFID chip 5.

Preferably, the step of applying pressure and/or temperature to the solid carrier 4 is locally applied to limited portion of the mat 1 (whereon the carrier 4 is placed) and to the entirety of the carrier 4.

Different types of materials and process parameters of both the carrier 4 and the bottom support 2 are envisaged by the applicant.

For instance, in one embodiment, the material of the bottom support 2 of the mat 1 is rubber and the material of the solid carrier 4 is vinyl.

In another embodiment, the material of both the bottom support 2 and the solid carrier 4 of the mat 1 is cured or uncured rubber.

Process parameters are for instance the following.

In one embodiment, the temperature is included between 140° C. and 180° C., the pressure is included between 0.2 Bar and 3 Bar, and the time of application of the temperature and pressure is between 1 min and 15 min.

Preferably, the temperature is included between 150° C. and 170° C., the pressure is included between 0.4 Bar and 2.7 Bar, and the time of application of the temperature and pressure is between 1.5 min and 13 min.

The above parameters have been applied by the applicant in experiments carried out, among other, on both
  Rubber (mat side)/vinyl (RFID tag side) and
  cured or uncured rubber (mat side)/rubber (RFID tag side).

In one embodiment carried out to embed the RFID tag during mat manufacturing, the following parameters have been adopted:
  Temperature: 160° C.;
  Pressure 2.5 Bar;
  Timing: 12 min.

In one embodiment carried out to embed the RFID tag into a mat already finished (retrofitting), the following parameters have been adopted
  Temperature: 200° C.
  Pressure 0.5 min
  Timing: 2 min

The invention claimed is:

1. A method for embedding an electronic device, into a mat,
  the mat having
    a bottom support intended to contact a floor, in use, and including a first material, wherein a surface portion of the bottom support is flat,
    a walkable surface,
  the electronic device being supported by a solid carrier, wherein
  a material of the solid carrier and the first material of the bottom support of the mat are suitable to join if contacted each other and subject to a temperature and/or a pressure above predetermined thresholds for a predetermined time, the pressure pushing the electronic device against the bottom support;
  wherein embedding the electronic device to the mat includes the steps of:
    placing the solid carrier on the surface portion of the bottom support of the mat;
    applying the pressure or temperature to the solid carrier;
    ending application of said pressure and/or temperature, wherein
  after the predetermined time said step of applying pressure and/or temperature is ended and the solid carrier is melted into the bottom support and/or dissolved, and the electronic device remains embedded in the bottom support, wherein
  embedding is not reversible and the solid carrier is no longer retrievable from the bottom substrate, and wherein the surface portion of the bottom support remains flat after embedding the electronic device.

2. The method for embedding the electronic device to the mat according to claim 1, wherein the mat is already available for use to walk on and the step of embedding the electronic device is carried out on the mat already available for use to walk on.

3. The method for embedding the electronic device to the mat according to claim 1, wherein said step of embedding the electronic device is carried out during a step of manufacturing the mat.

4. The method for embedding the electronic device to the mat according to claim 2, wherein the temperature of the mat immediately before said step of applying pressure and/or temperature is room temperature.

5. The method for embedding the electronic device to the mat according to claim 1, wherein the bottom support is solid before said step of applying pressure and/or temperature.

6. The method for embedding the electronic device to the mat according to claim 1, wherein the outside shape of the bottom support of the mat does not undergo shape changes due to embedding the electronic device.

7. The method for embedding the electronic device to the mat according to claim 1, wherein the solid carrier is a bar or parallelepiped like shape having a width equal to or greater than a maximum width of an antenna of the electronic device in an X direction of the bar, a length equal to or greater than a maximum length of the antenna in an Y direction and a thickness equal to or greater than a thickness of the electronic device in a Z direction.

8. The method for embedding the electronic device to the mat according to claim 1, wherein the bottom support has no pockets for receiving the electronic device before said step of applying the temperature and/or the pressure.

9. The method for embedding the electronic device to the mat according to claim 1, wherein the solid carrier and the bottom support of the mat undergo a first status change during said step of applying the pressure and/or the temperature and a second status change within a predetermined time after an end of the step of applying the pressure and/or the temperature.

10. The method for embedding the electronic device to the mat according to claim 1, wherein said step of applying pressure and/or temperature to the solid carrier is locally applied to the surface portion of the mat where the solid carrier is placed.

11. The method for embedding the electronic device to the mat according to claim 1, wherein the material of the bottom support of the mat is rubber and the material of the solid carrier is vinyl.

12. The method for embedding the electronic device to the mat according to claim 1, wherein the material of both the bottom support and the solid carrier of the mat is cured or uncured rubber.

13. The method for embedding the electronic device to the mat according to claim 1, wherein
  the temperature is included between 140° C. and 180° C.;
  the pressure is included between 0.2 Bar and 3 Bar; and
  the predetermined time is between 1 min and 15 min.

14. The method for embedding the electronic device to the mat according to claim 1, wherein the temperature is 160° C.; the pressure is 2.5 Bar; the predetermined timing is 12 min, and wherein said step of applying the pressure and/or temperature to the solid carrier for the predetermined time is carried out during lamination of the mat.

15. The method for embedding the electronic device to the mat according to claim 1, wherein the temperature is 200° C., the pressure is 0.5 Bar and the timing is 2 min, and wherein said step of applying the pressure and/or temperature to the solid carrier for the predetermined electronic device is carried out on the mat already finished.

16. The method for embedding the electronic device to the mat according to claim 4, wherein the temperature is between 5 and 40° C.

17. The method for embedding the electronic device to the mat according to claim 13, wherein the temperature is between 15° and 170° C.

18. The method for embedding the electronic device to the mat according to claim 13, wherein the pressure is between 0.4 Bar and 2.7 Bar.

19. The method for embedding the electronic device to the mat according to claim 13, wherein the predetermined time is between 1.5 and 13 min.

\* \* \* \* \*